(12) United States Patent
Knight

(10) Patent No.: US 6,382,106 B1
(45) Date of Patent: May 7, 2002

(54) SKELETAL FRAME FOR REVOLVING VEHICLE PLATFORM TURNTABLE

(76) Inventor: Elijah Knight, 6930 N. Broad St., Philadelphia, PA (US) 19126

( * ) Notice: Subject to any disclaimer, the term of this patent is extended or adjusted under 35 U.S.C. 154(b) by 0 days.

(21) Appl. No.: 09/707,425

(22) Filed: Nov. 7, 2000

(51) Int. Cl.$^7$ .................................................. B60S 13/02
(52) U.S. Cl. ........................... 104/44; 104/35; 104/39; 104/45; 414/228; 285/412
(58) Field of Search .............. 104/44, 35, 39, 104/45; 414/228; 285/412; 403/337, 205, 403, 237, 235

(56) References Cited

U.S. PATENT DOCUMENTS

| | | | | |
|---|---|---|---|---|
| 291,773 A | * | 1/1884 | Reilly .................... | 403/337 |
| 937,301 A | * | 10/1909 | Guild ..................... | 403/357 |
| 3,839,965 A | * | 10/1974 | Frederick ................ | 104/35 |
| 3,854,404 A | * | 12/1974 | Janda ..................... | 104/44 |
| 3,888,184 A | * | 6/1975 | Maeda .................... | 104/37 |
| 4,077,327 A | | 3/1978 | Ziegenfuss ............... | 104/35 |
| 4,172,422 A | | 10/1979 | McBride ................. | 104/44 |
| 4,562,774 A | | 1/1986 | Dehring .................. | 104/42 |
| 4,608,929 A | * | 9/1986 | Park ...................... | 104/44 |
| 4,716,837 A | * | 1/1988 | Valencia ................. | 104/38 |
| 4,753,173 A | * | 6/1988 | James .................... | 104/45 |
| 4,777,884 A | | 10/1988 | Seay, Jr. ................. | 104/42 |
| 5,086,704 A | * | 2/1992 | Mueller .................. | 104/44 |
| 5,400,550 A | | 3/1995 | Beasley .................. | 52/65 |

* cited by examiner

Primary Examiner—S. Joseph Morano
Assistant Examiner—Frantz F. Jules
(74) Attorney, Agent, or Firm—Susan Borden Evans

(57) ABSTRACT

The present invention describes an improved skeletal frame for a revolving vehicle platform turntable. The improved device is used to support a vehicle turntable and easily installed in any location. The skeletal frame includes a cylindrical circular tubular body made of 2 semicircular sections, a main frame structure including web arms are connected to both sides of the cylindrical circular tubular body, a roller chain pulley sprocket assembly is attached to the center cross section of the main structure frame for driving the skeletal frame. It is preferably installed below ground level so that the upper level of the turntable is level with the ground. Another improved component of this invention is the absence of welded parts.

8 Claims, 15 Drawing Sheets

US 6,382,106 B1

SKELETAL FRAME FOR REVOLVING VEHICLE PLATFORM TURNTABLE

BACKGROUND

The present invention relates generally to a Skeletal Frame For Revolving Vehicle Platform Turntable for vehicles. This structure is particularly useful for residential homes inside or outside of a garage. In the city this invention has the advantage of permitting homeowners to drive in and out of their garages without backing into traffic by reversing the direction of their cars. This invention is an improvement over the art as it eliminates welded parts and facilitates the installation and disassembly of the device.

Various vehicle turntables are known in the art. Some typical examples of these prior art automobile turntables are found in U.S. Pat. No. 5,400,540 (Beasley); U.S. Pat. No. 5,086,704 (Mueller); U.S. Pat. No. 4,777,884 (Seay, Jr.); U.S. Pat. No. 4,562,774 (Dehring); U.S. Pat. No. 4,172,422 (McBride); and U.S. Pat. No. 4,077,327 (Ziegenfus).

These prior patents are distinguished from the present invention in that the present invention has no welded parts, utilizes a single rod track system and has a novel "support bracket" attachment which connects to the main structure frame.

This prior art does not disclose the instant invention.

SUMMARY OF THE INVENTION

The skeletal frame for a revolving vehicle platform turntable including:

A cylindrical tubular body consisting of two semi circular sections each connectedly joined by a cylinder end piece wherein the two cylinder end pieces have a lip and a plurality of drilled holes that line up with each other to receive screws that secure the end pieces in place;

A main structure frame attachably connected to both sides of the cylindrical tubular body at a center most position by a support bracket mounted on the cylindrical tubular body;

Two center structure frames positioned perpendicular and attachably connected to the main structure frame by connection means;

Web arms consisting of 4 inner web arms and 4 outer web arms attachably connected between the center structure frames and the main structure frame each web arm having three closed sides and 1 open side with a sleeve at both ends of said web arms;

A roller chain pulley sprocket assembly attachably connected at the center cross section of the main structure frame and the two center structure frames;

A plurality of wheel assembly mechanisms each having a "V" grooved castor wheel securely attached to the cylindrical tubular body; and A single rod track assembly affixed in a circular configuration to receive the "V" grooved castor wheel.

The invention also discloses a novel support bracket which when attached eliminates the need for certain welded parts.

BRIEF DESCRIPTION OF THE DRAWINGS

These as well as other features of the present invention will become more apparent upon reference to the drawings wherein.

DETAILED DESCRIPTION OF THE INVENTION

FIGS. 1–15 collectively illustrate the components of the Skeletal Frame For Revolving Vehicle Platform Turntable 10 of the present invention.

Figure 1:
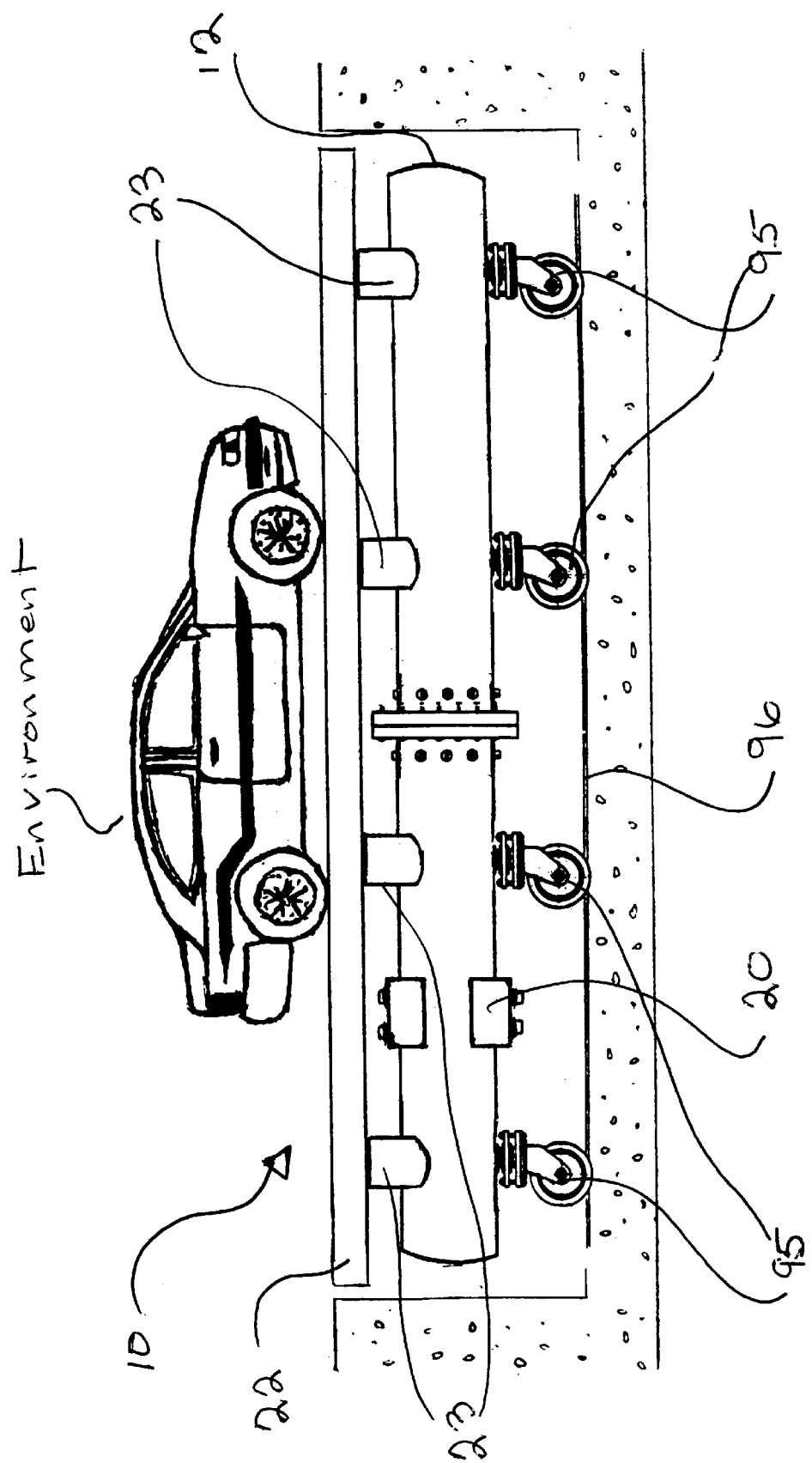
FIG. 1 is a side view of the Revolving Vehicle Platform Turntable in the Ground.

FIG. 1 illustrates a side view of the Revolving Vehicle Platform Turntable in the Ground. The skeletal frame 12 of the present invention supports the revolving vehicle platform turntable 22.

Figure 2:
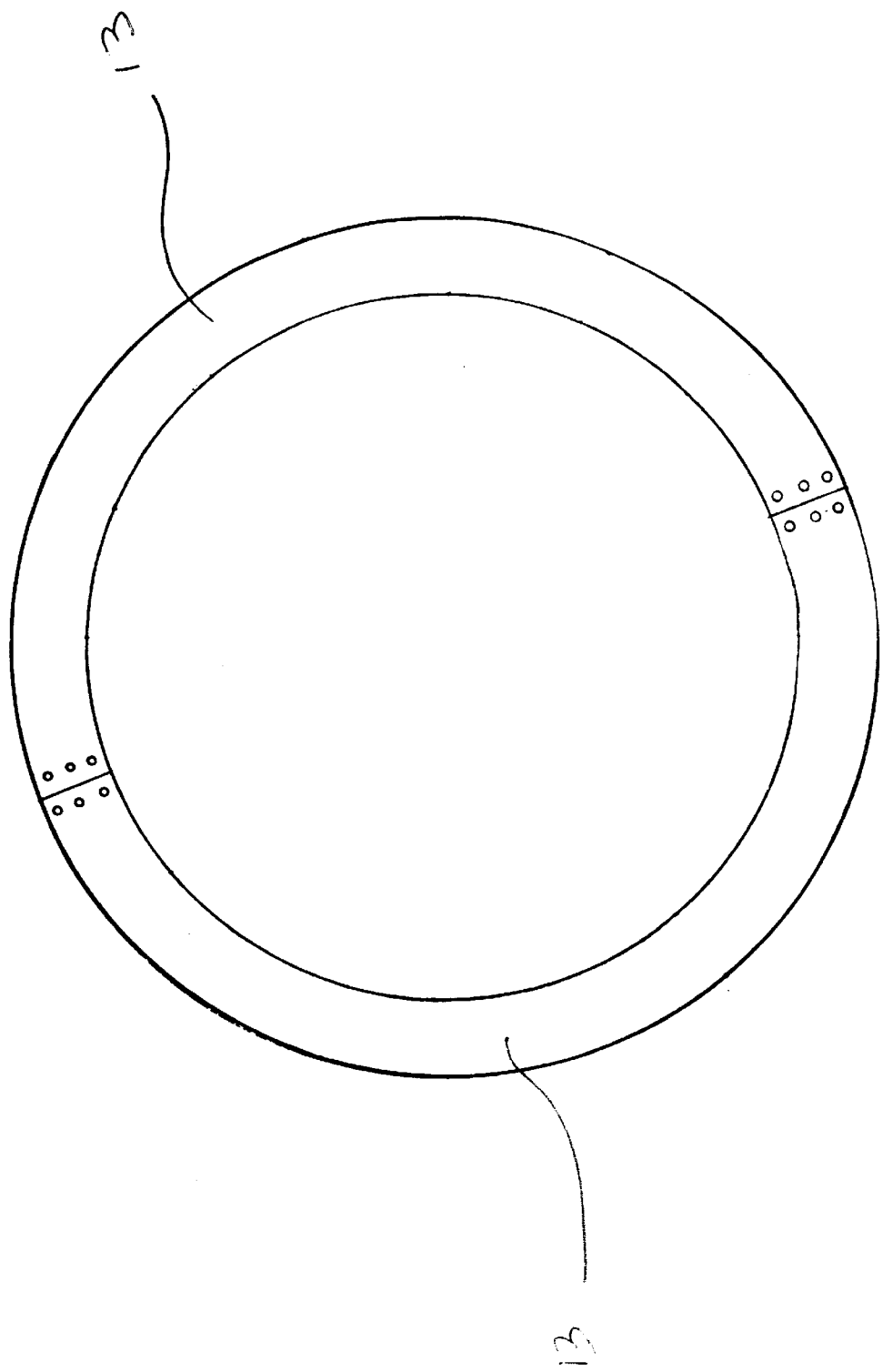
FIG. 2 is a front view of a cylindrical tubular body.

FIG. 2 illustrates a front view of a cylindrical tubular body 13 consisting of two semi circular sections each connectedly joined by a cylinder end piece 15.

Figure 3:
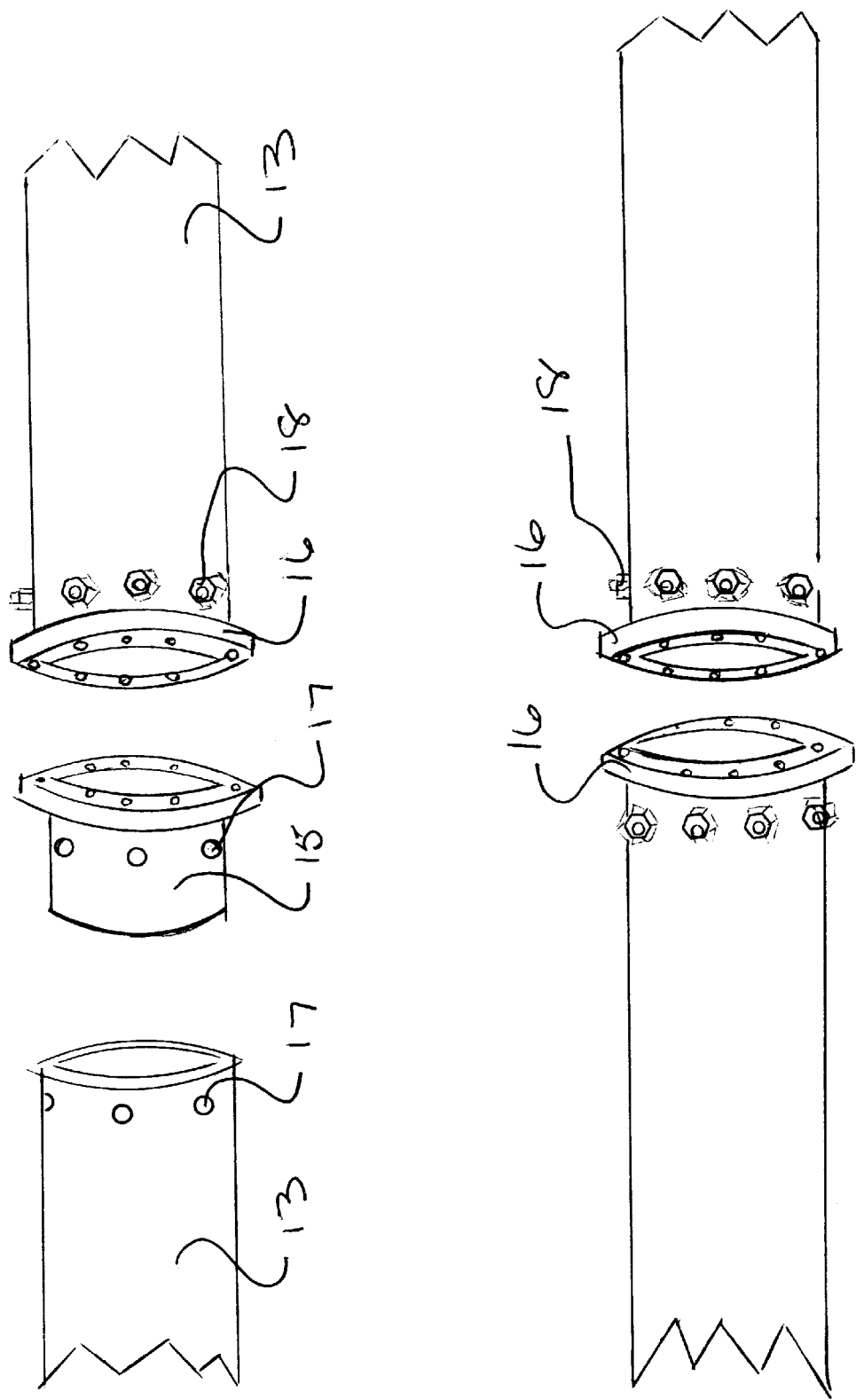
FIG. 3 is a front view of cylinder end pieces.
Figure 4:
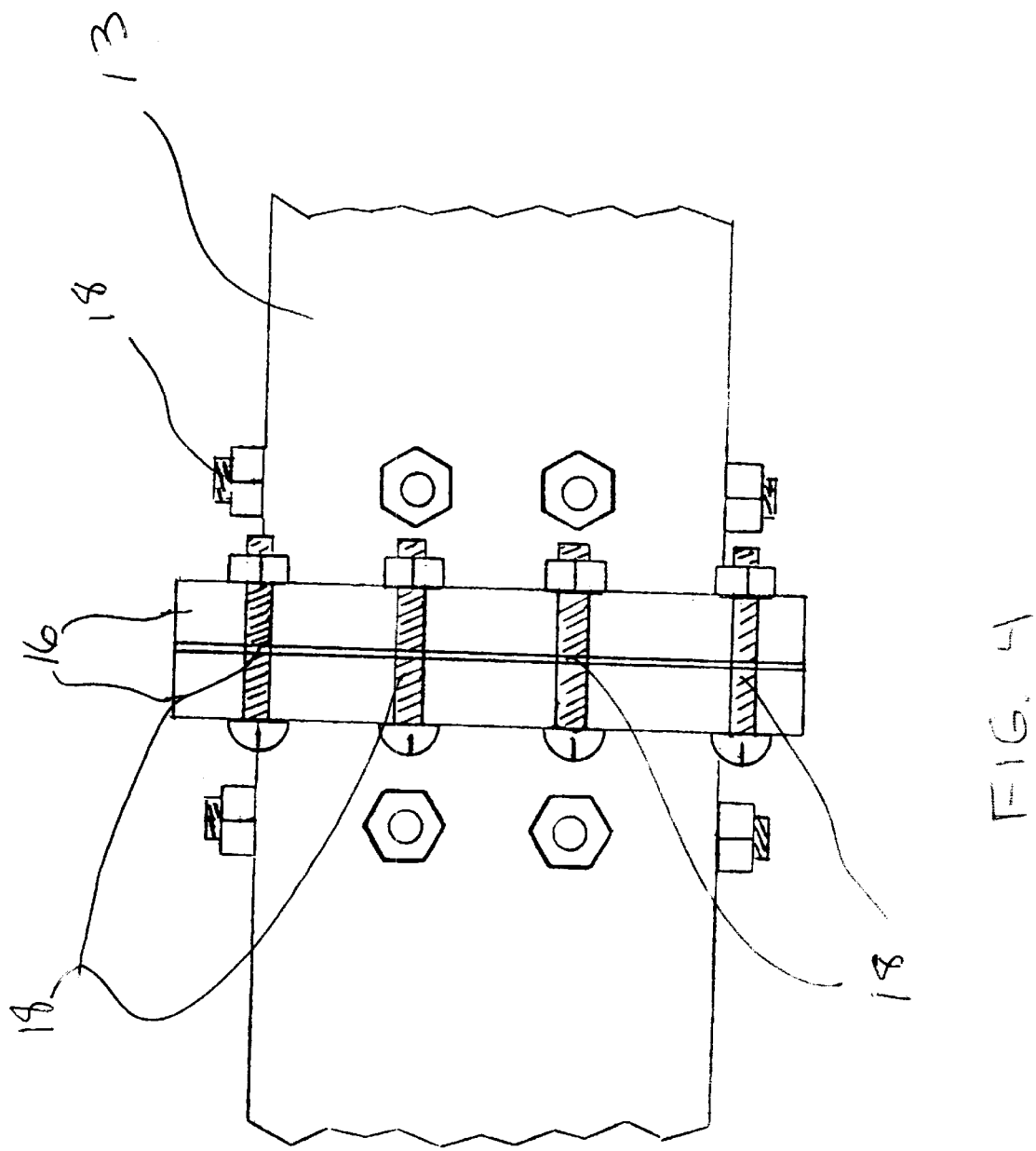
FIG. 4 is a front cut away view of the connection at the ends of two cylinders.

FIGS. 3 and 4 illustrate the cylinder end pieces 15 and their connection to each other and the cylindrical tubular body 13. The two cylinder end pieces 15 have a lip 16 and a plurality of drilled holes 17 that line up with each other to receive screws 18 that secure the end pieces 15 in place, fitted in the interior of the cylindrical tubular body 13.

Figure 5:
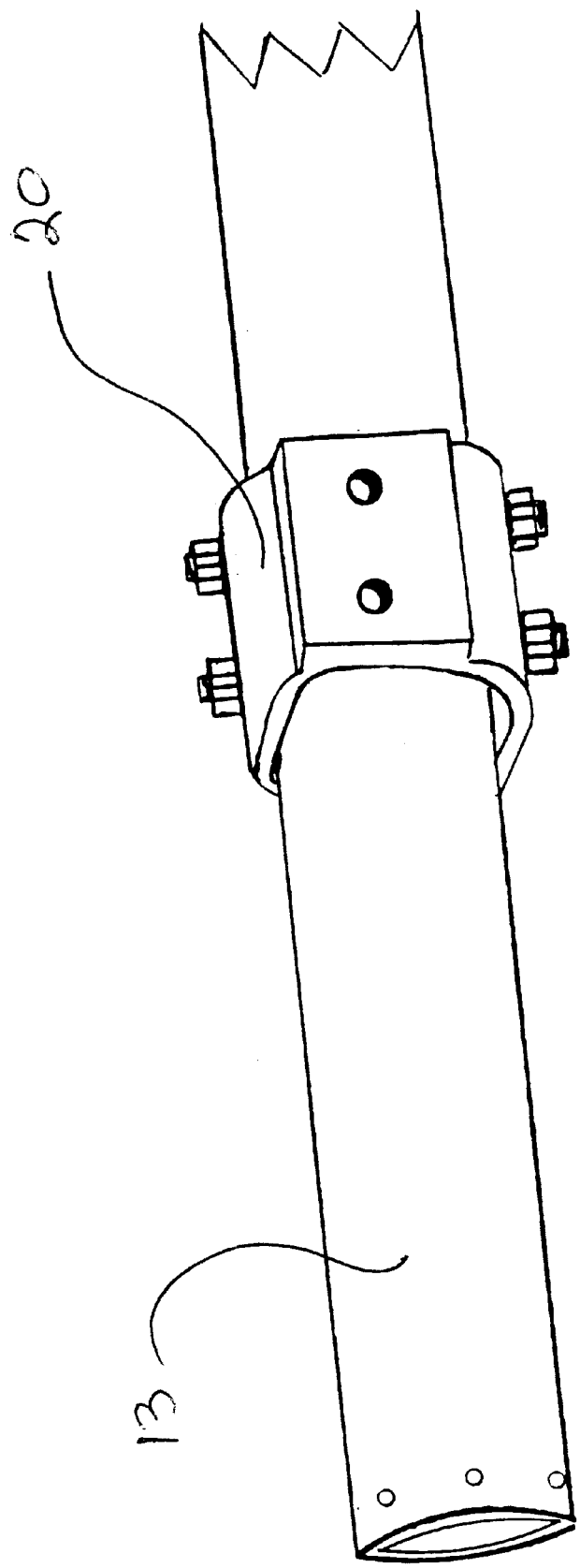
FIG. 5 is a front view of the cylinder and support bracket.
Figure 6:
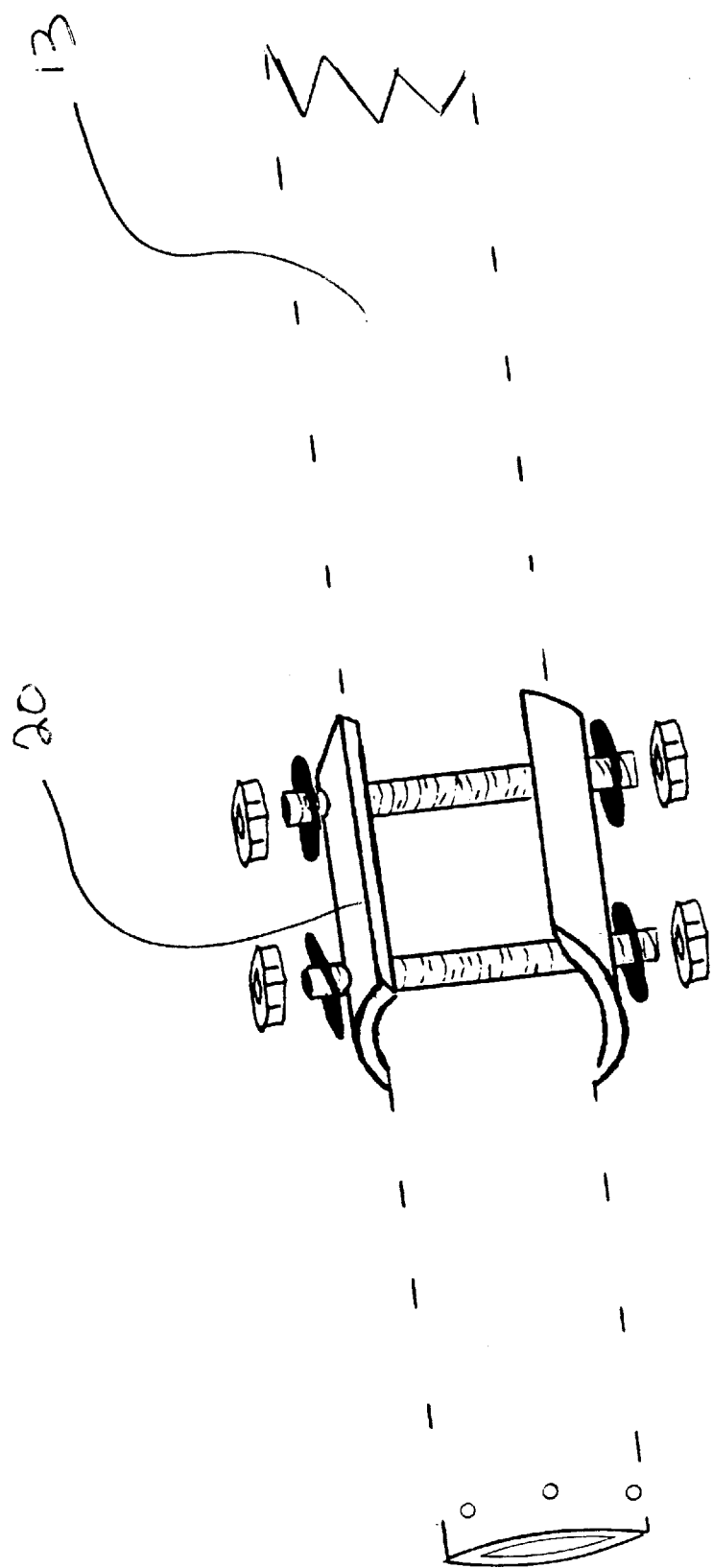
FIG. 6 is a rear cut away view of cylinder and support bracket.

FIGS. 5 and 6 illustrate the cylindrical tubular body 13 in connection with a support bracket 20. The support bracket screws through the cylindrical tubular body 13.

Figure 7:
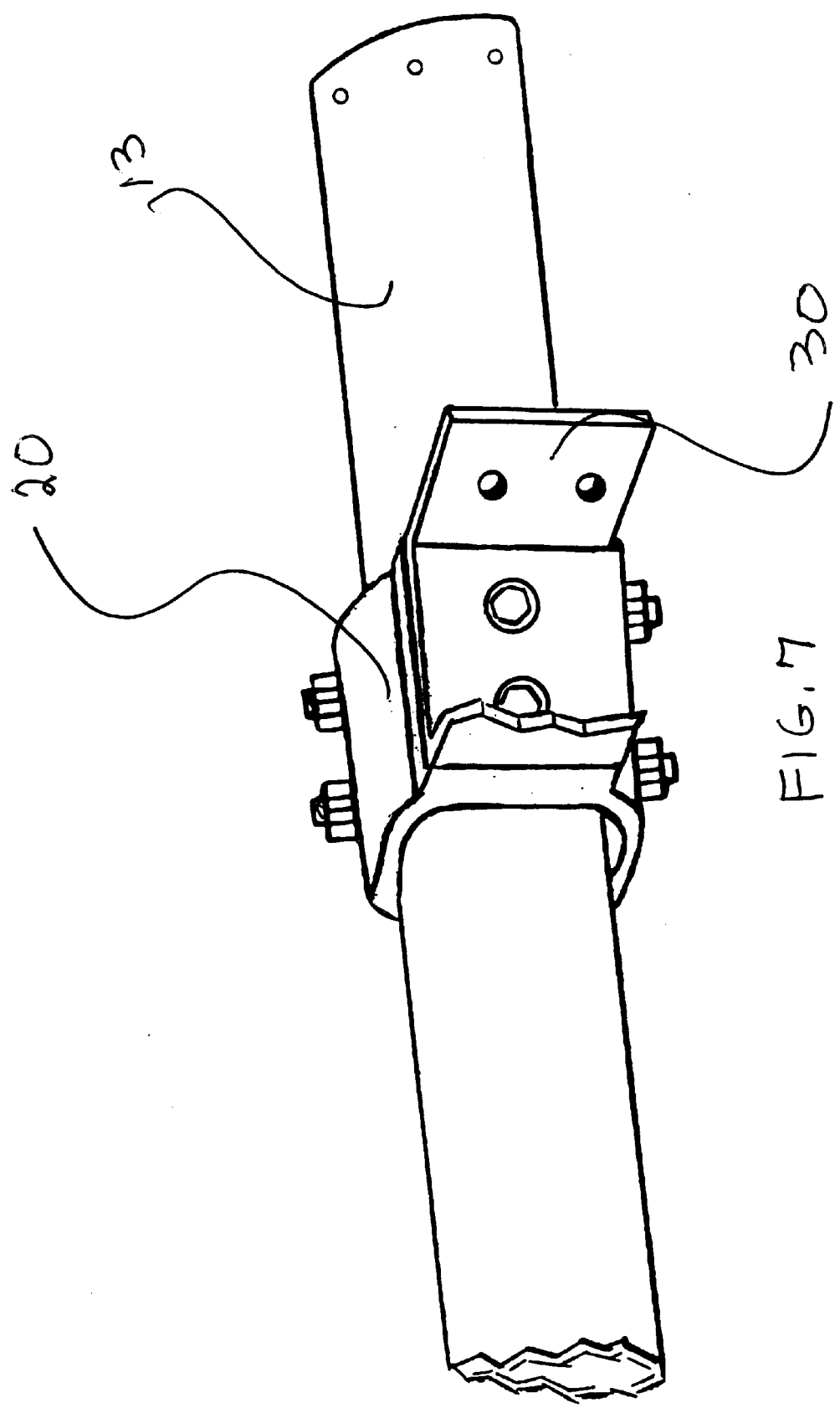
FIG. 7 is a cut away view of a C clamp mounted on the support bracket an the cylindrical tubular body.

FIG. 7 illustrates a C clamp 30 mounted on the support bracket 20 which in turn is mounted on the cylindrical tubular body 13. The support bracket 20 is formed from a semicircular structure with two curved sides and a flat back portion; and several pairs of threaded holes drilled on the two curved sides and the flat back wherein the holes are threaded to receive threaded bolts and positioned to attach to the cylindrical tubular body 13 at predetermined positions.

Figure 8:
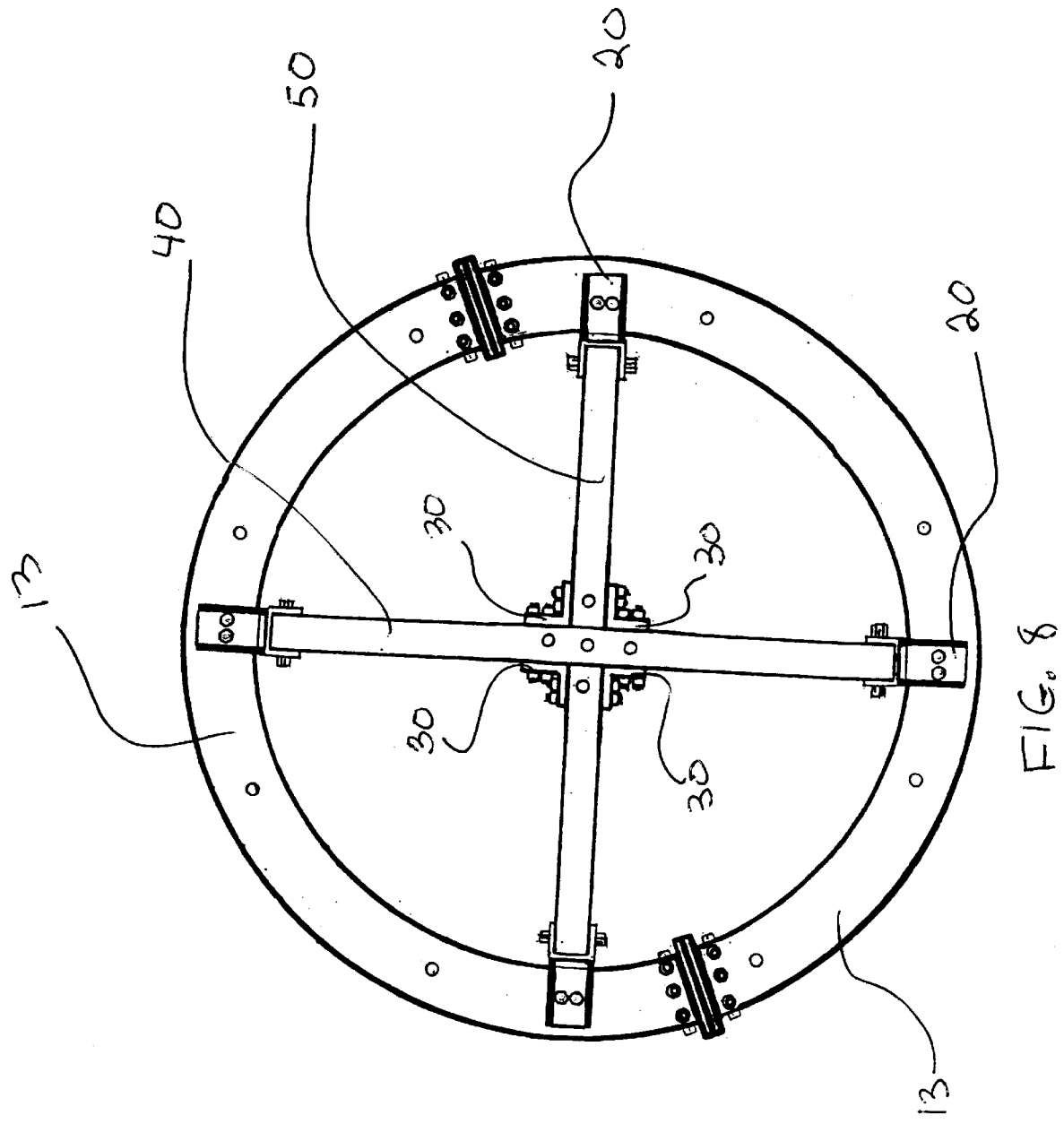
FIG. 8 is a top view of main structure frame and two center structure frames.

FIG. 8 illustrates a main structure frame 40 attachably connected to both sides of the cylindrical tubular body 13 at a center most position by the support bracket 20 mounted on the cylindrical tubular body 13. Two center structure frames 50 are positioned perpendicular and attachably connected to the main structure frame 40 by connection means, preferably a C Clamp 30.

Figure 9:
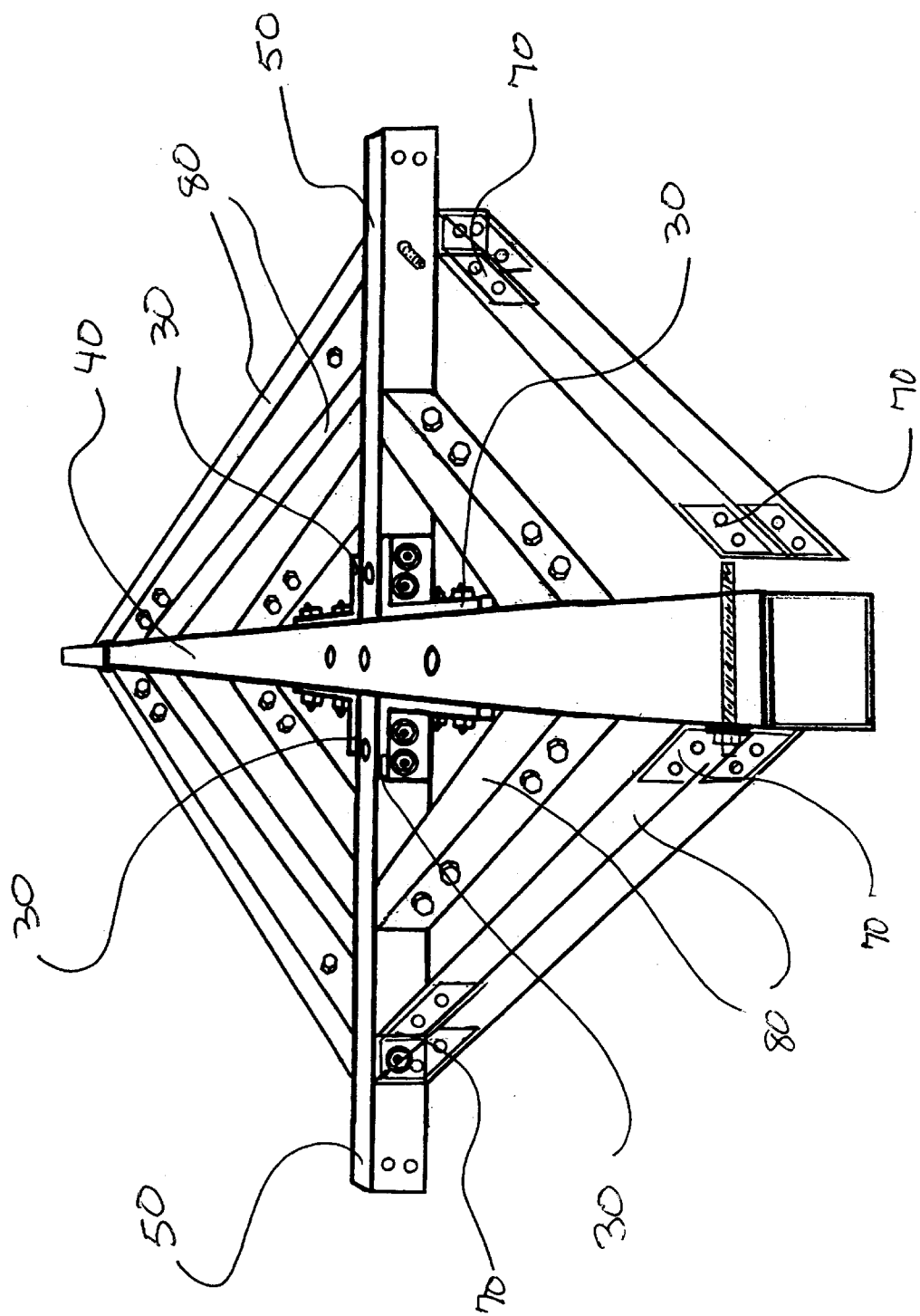
FIG. 9 is a top view of the web arm connections to the main structure frame and the two center frames.

FIG. 9 further illustrates the main structure frame 40 and two center structure frames 50 attached to web arms 80. The web arms 80 consist of 4 inner web arms and 4 outer web arms attachably connected between the center structure frames 50 and the main structure frame 40 each web arm 80 having three closed sides and 1 open side with a sleeve 70 at both ends of said web arms 50.

Figure 10:
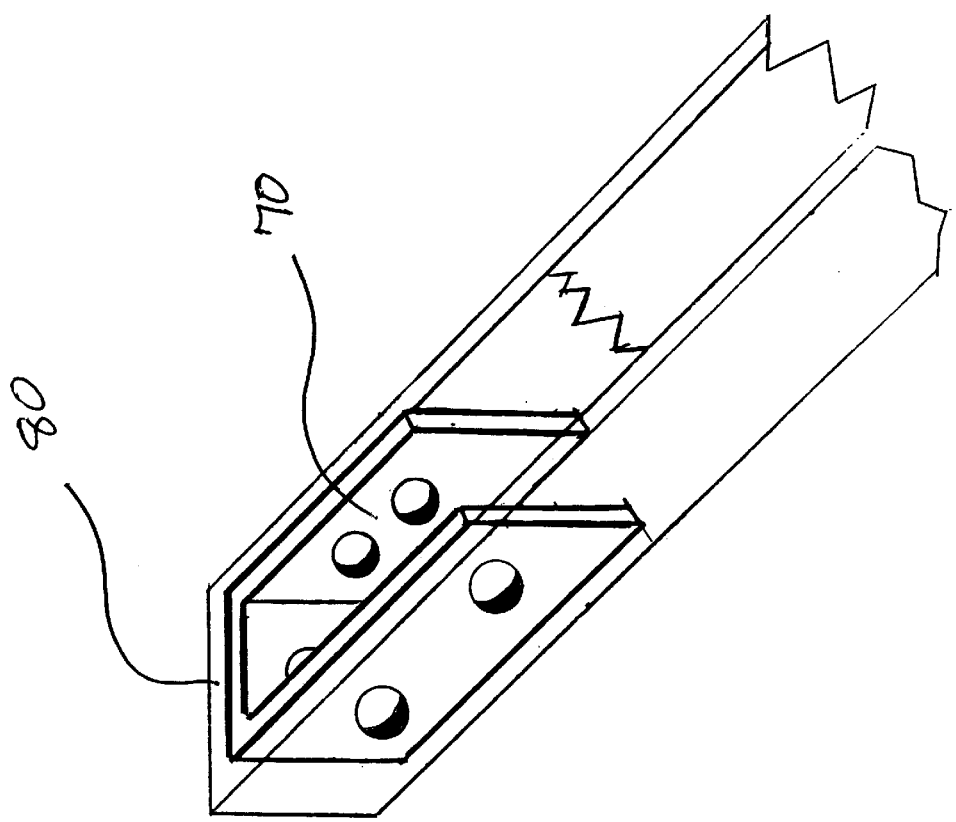
FIG. 10 is a top view of a sleeve inside the web arm.

FIG. 10 illustrates a sleeve 70 inside the web arm 80. The sleeve 70 provides additional support and also an attachment means.

Figure 11:
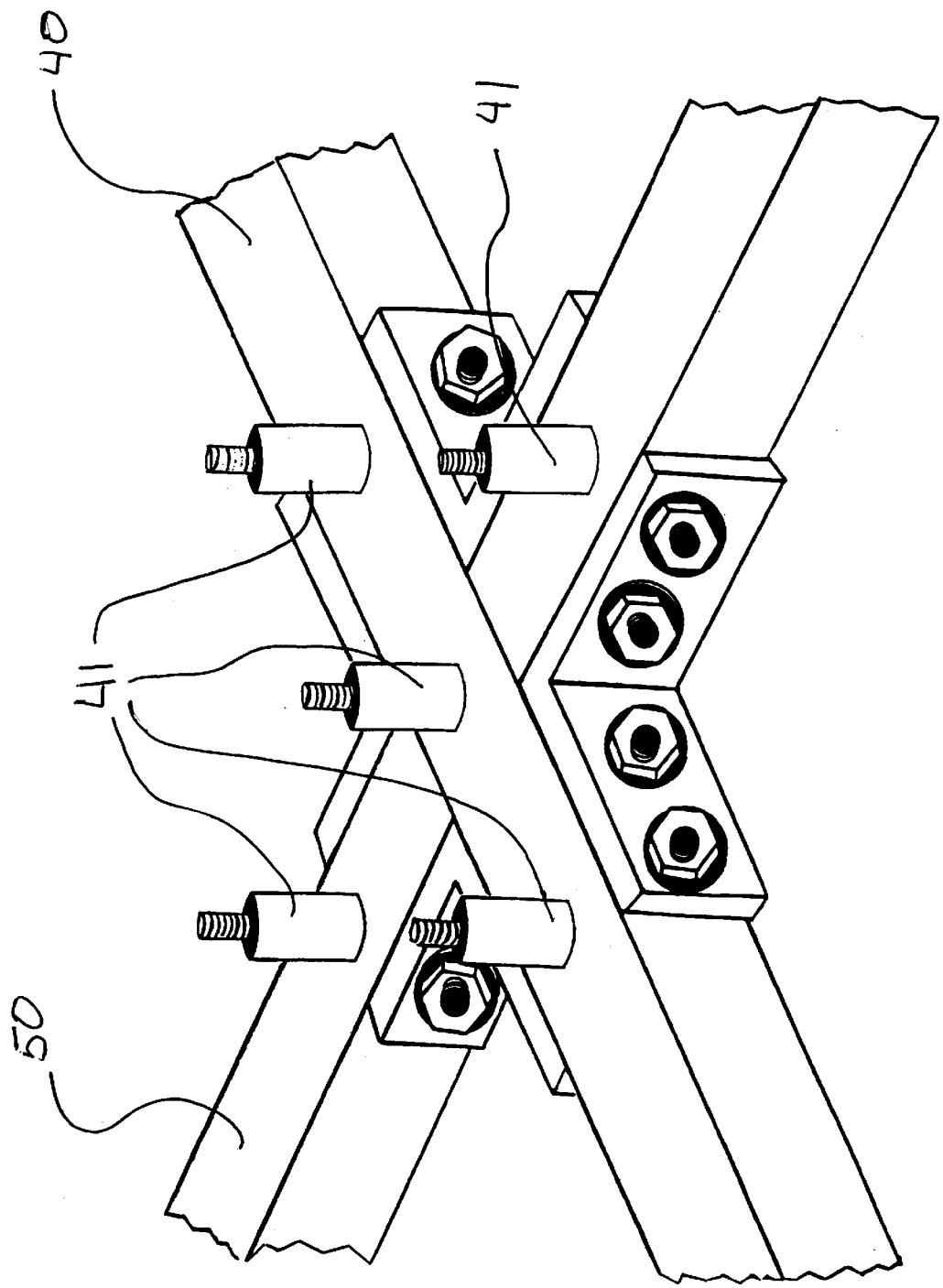
FIG. 11 is a bottom view of spacer connections at the bottom of the intersection of the main structure frame and the two enter frames.

FIG. 11 illustrates the frame spacers 41 at the bottom of the intersection of the main structure frame 40 and the two center frames 50. The frame spacers 41 provide a vacant area between the frames and the roller chain pulley sprocket assembly 90.

Figure 12:
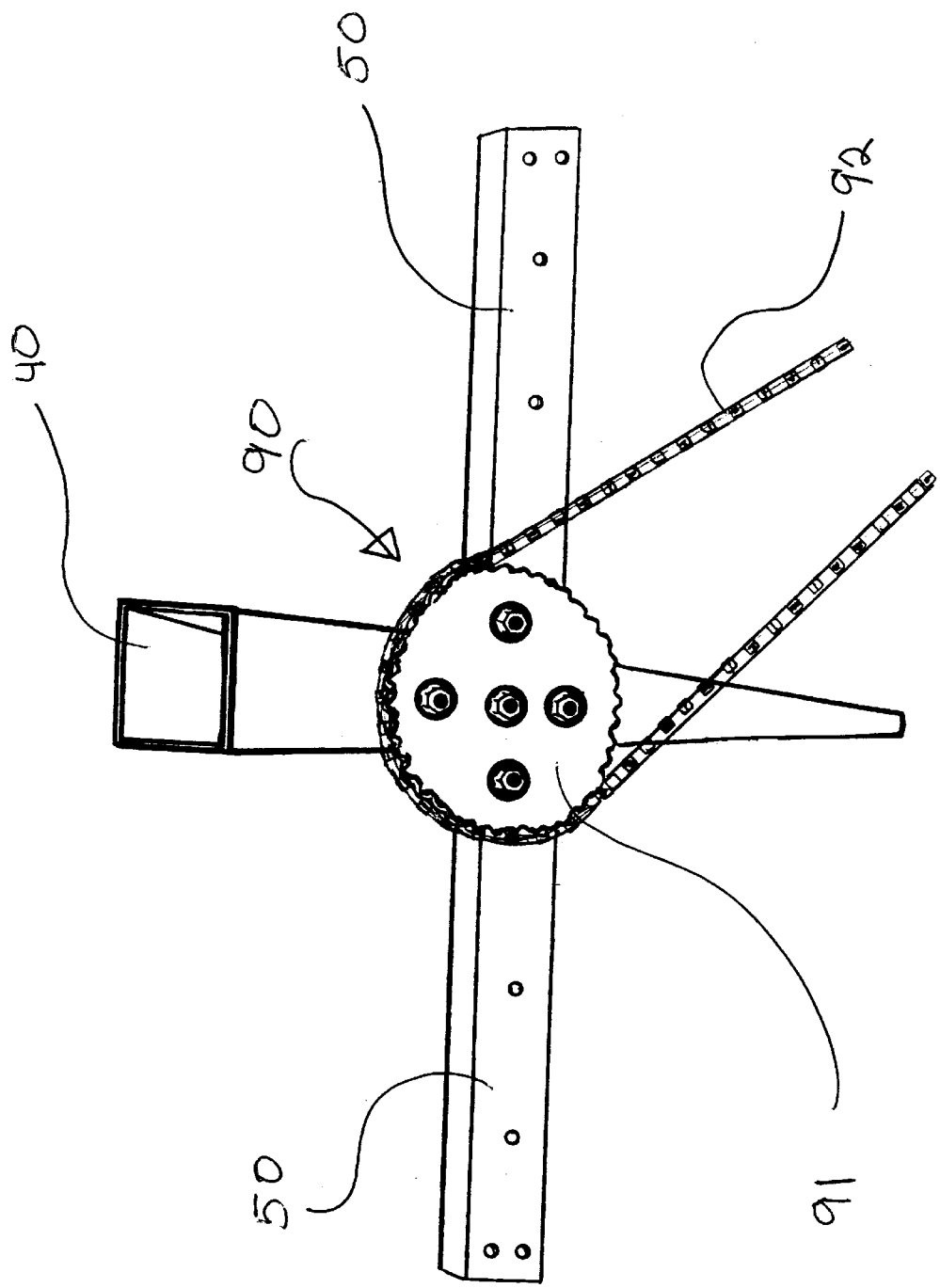
FIG. 12 is a bottom view of the sprocket connection and riveted roller chain.
Figure 13:
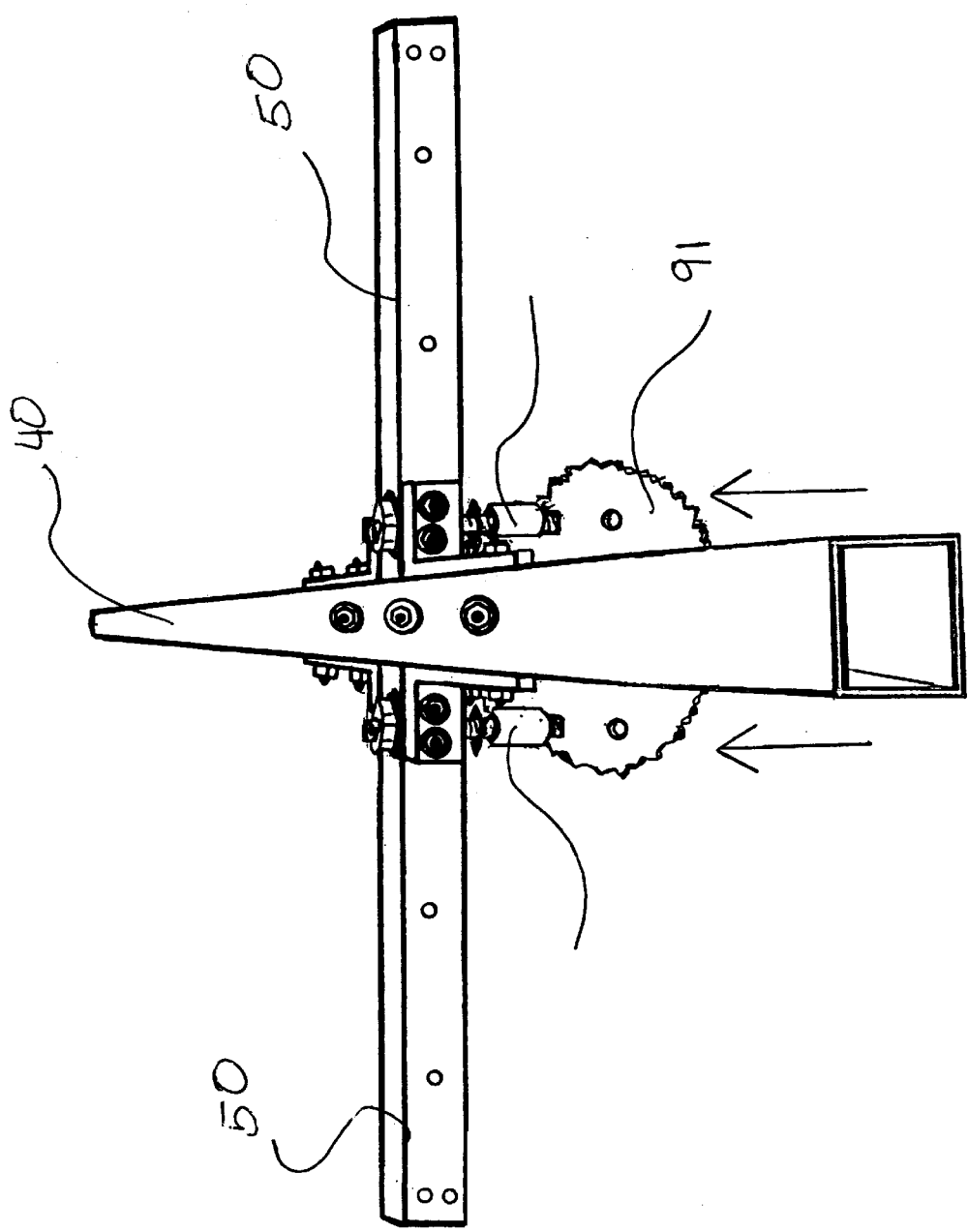
FIG. 13 is a front view of the sprocket attachment to the sprocket spacers.

FIGS. 12 and 13 illustrate the sprocket 91 connection and riveted roller chain 92. A roller chain pulley sprocket assembly 90 attachably connected at the center cross section of the main structure frame 40 and the two center structure frames 50. FIG. 13 additionally illustrates the sprocket spacers 93 between the sprocket 91 and the structure frames 40/50.

Figure 14:
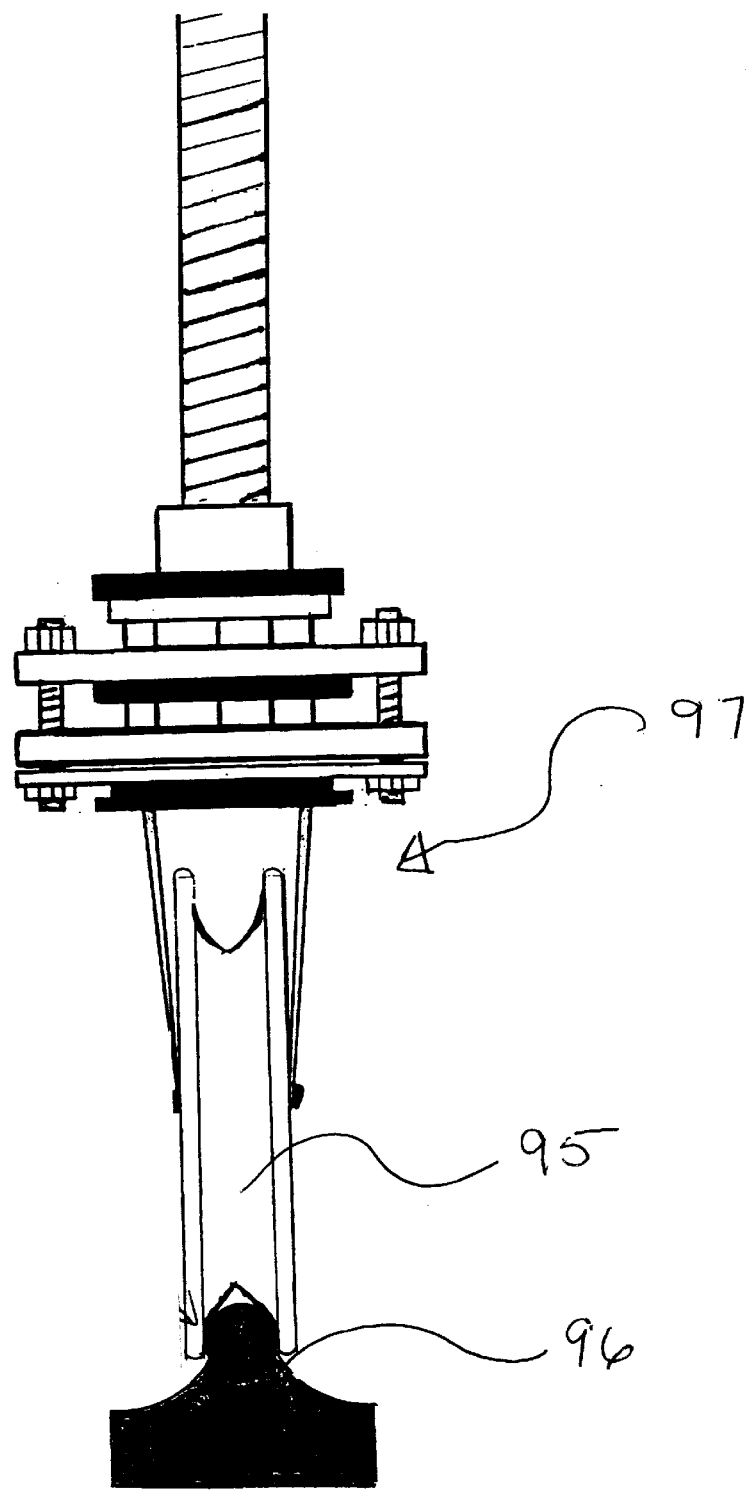
FIG. 14 is a front view of the "V" grooved castor wheels on the single rod track.

FIG. 14 illustrates the "V" grooved castor wheels 95 on the single steel rod track 96. The present invention has a plurality of wheel assembly mechanisms 94 housing a "V" grooved wheel 95 and securely attached to the cylindrical tubular body 13 by an attachment mechanism well known in the art. The wheel assembly mechanism 94 has an even numbered plurality of heavy duty V grooved castor wheels 95 positioned equidistant along the cylindrical tubular body 13, preferably 6–10 wheels, more preferably 8 wheels. A single steel rod track assembly 96 is affixed in a circular configuration to receive the "V" grooved wheels 95.

Figure 15:
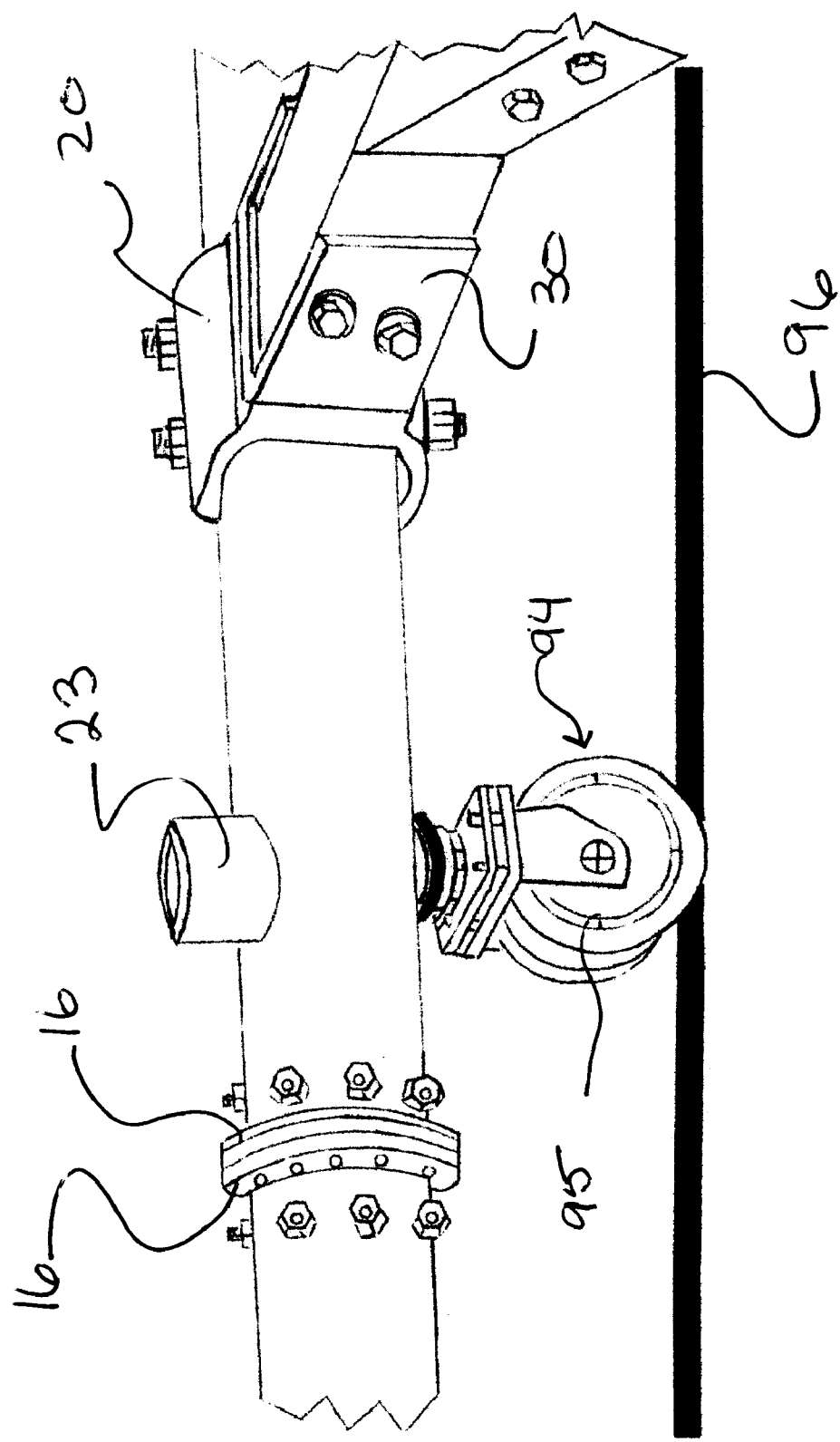
FIG. 15 is a side view of the platform spacer mounted on the cylindrical tubular body and the corresponding wheel assembly.

FIG. 15 illustrates the platform spacer 23 mounted on the cylindrical tubular body 13 and corresponding wheel assembly 94.

The present invention is composed of sturdy materials in its entirety, preferably structural steel or metal alloys of iron or any of a number of reinforced plastic or plastic like materials able to support the weight of vehicles such as are well known in the art.

Changes and modifications in the specifically described embodiments can be carried out without departing from the scope of the invention which is intended to be limited only by the scope of the appended claims.

What is claimed is:

1. A skeletal frame for a revolving vehicle platform turntable comprising:
    a cylindrical tubular body consisting of two semi circular sections each connectedly joined by a cylinder end piece wherein the cylinder end piece has a lip and a plurality of drilled holes that line up with a corresponding end piece to receive screws that secure the cylinder end piece and corresponding cylinder end piece in place;
    a main structure frame attachably connected to both sides of the cylindrical tubular body at a center most position by a support bracket mounted on the cylindrical tubular body;
    two center structure frames positioned perpendicular and attachably connected to the main structure frame by connection means;
    web arms consisting of 4 inner web arms and 4 outer web arms attachably connected between the center structure frames and the main structure frame each web arm having three closed sides and 1 open side with a sleeve at both ends of said web arms;
    a roller chain pulley sprocket assembly attachably connected at the center cross section of the main structure frame and the two center structure frames;
    a plurality of wheel assembly mechanisms each having a "V" grooved castor wheel securely attached to the cylindrical tubular body; and
    a single rod track assembly affixed in a circular configuration to receive the "V" grooved castor wheel.

2. A skeletal frame according to claim 1 wherein the entire assembly is positioned below ground level.

3. A skeletal frame according to claim 1 wherein the wheel assembly mechanism has an even numbered plurality of heavy duty castor wheels positioned equidistant along the cylindrical tubular body.

4. A skeletal frame according to claim 3 wherein the wheel assembly has from 6 to 10 wheels.

5. A skeletal frame according to claim 4 wherein the wheel assembly has 8 wheels.

6. A support bracket utilized in claim 1 comprising
    a semicircular structure with two curved sides and a flat back portion; and
    several pairs of threaded holes drilled on the two curved sides and the flat back wherein the holes are threaded to receive threaded bolts and positioned to attach to the cylindrical tubular body at predetermined positions.

7. A support bracket according to claim 6 wherein the support bracket is composed of a strong material selected from the group consisting of steel, reinforced steel and metal alloys.

8. A circular platform supported by the skeletal frame according to claim 1.

* * * * *